United States Patent [19]
Courant et al.

[11] Patent Number: 5,522,073
[45] Date of Patent: May 28, 1996

[54] METHOD AND APPARATUS FOR AUTOMATING AND CONTROLLING EXECUTION OF SOFTWARE TOOLS AND TOOL SETS VIA WHEN/THEN RELATIONSHIPS

[75] Inventors: Joseph J. Courant, Fowlerville, Mich.; Byron T. Jenings, Jr., Fort Collins, Colo.

[73] Assignee: Hewlett-Packard Company, Palo Alto, Calif.

[21] Appl. No.: 156,592

[22] Filed: Nov. 22, 1993

[51] Int. Cl.$^6$ ................................................. G06F 9/44
[52] U.S. Cl. ................................. 395/700; 364/DIG. 1; 364/280; 364/281.3; 364/286
[58] Field of Search ................................................. 395/700

[56] References Cited

U.S. PATENT DOCUMENTS

| | | | |
|---|---|---|---|
| 5,204,947 | 4/1993 | Bernstein et al. | 395/157 |
| 5,228,137 | 7/1993 | Kleinerman et al. | 395/500 |

OTHER PUBLICATIONS

Mark G. Sobell, "A Practical Guide to the UNIX System", Second Edition, The Benjamin/Cummings Publishing Company, Copyright 1989 by Mark G. Sobell.

*Primary Examiner*—Kevin A. Kriess
*Attorney, Agent, or Firm*—Cynthia S. Baan

[57] ABSTRACT

A method and apparatus for automating and controlling execution of tools in a computer system that includes a number of software application tools. The method and apparatus of the present invention enables a user without knowledge of the event connector, the message server or of software programming to create customized tool interactions from the different application tools present to match the user's needs. The method and apparatus of the present invention gives the user control of software tool integration without having to write any code or changing the implementations of the individual software tools. The tool integration is based on user-defined, event-driven interactions between the functions of the different tools of the system.

12 Claims, 18 Drawing Sheets

METHOD AND APPARATUS FOR AUTOMATING AND CONTROLLING EXECUTION OF SOFTWARE TOOLS AND TOOL SETS VIA WHEN/THEN RELATIONSHIPS

CROSS-REFERENCE TO RELATED APPLICATIONS

The following United States patents are related to the present application and incorporated herein be reference: "Method and Apparatus for Computer Program Encapsulation", Ser. No. 07/358,962, filed May 26, 1989, now U.S. Pat. No. 5,075,847, issued Dec. 24, 1991 and "Method and Apparatus for Controlling Execution of Tools in a Computer-Aided Software Engineering System", Ser. No. 07/359,912, filed Jun. 1, 1989, now U.S. Pat. No. 5,212,792, issued May 18, 1993.

FIELD OF THE INVENTION

The present invention relates generally to the field of computer systems and, in particular, to a program communication facility which improves communication and cooperation between software tools. More specifically, the present invention provides a method and apparatus for automating and controlling execution of and modifying the behavior of software tools.

BACKGROUND OF THE INVENTION

Computer systems typically include a number of different tools, or programs, designed to assist the user in accomplishing a particular task. Some of the more common tools used in computer systems include, by way of example only, a program edit tool, a build tool, a spell check tool, a debug tool, and a version management tool. In most prior art computer system environments, tool cooperation was achieved by the user orchestrating even the simplest tool interactions. In its basic form, such a computer system allows the user to utilize the functionalities of a particular tool via a windows-based interface. A block diagram of such a computer system's tool set 100 is given in FIG. 1. It will be appreciated from the system in FIG. 1 that tool A 110, tool B 120, and tool C 130 are not capable of communicating with other tools on computer system 100.

FIG. 2 shows a block diagram of a tool set with programmatic access to the functionality of each tool. Basically, FIG. 2 shows a system in which the tools have the ability to send messages (112, 122, 132) and to receive messages (114, 124, 134). The disadvantage of this system is that although each tool has the capability to send and receive messages, there is still no communication between each of the individual tools.

FIG. 3 shows a block diagram of a tool set with fixed connections between the functionalities of the different tools. Further information regarding the implementation of a system such as the one shown in FIG. 3 is provided in the aforementioned U.S. Pat. No. 5,075,847 entitled "Method and Apparatus for Computer Program Encapsulation." The system of FIG. 3 is an improvement over that of FIG. 2 in that user productivity is enhanced by providing means for the individual tools to request actions from other tools rather than requiring user intervention. The system of FIG. 3 is a preprogrammed, event driven system. For example, assuming tool A is an editor tool and tool B is a spell check tool, the system may be preprogrammed such that whenever the edit tool saves a file, the spell check tool spell checks the file. While such systems are generally satisfactory, these systems have very generic preprogrammed interactions that can only be changed by a software programmer.

Therefore, the general user is not able to customize his system to the tool interactions of his choice. The general user will have to settle for preprogrammed tool and event interactions or invoke the use of a tool manually. While the user can manually invoke tools as necessary, it is desirable for the user to be able to customize a tool interaction system to his own unique needs, so that he can then concentrate on application tasks rather than coordinating and managing the software tools. However, most general users are unable to create tool and event interactions of their own choices, because they do not know how to program software. Accordingly, there is a need for a system that would allow a general computer user to modify the behavior of his software tools and the interactions between his software tools, simply, without writing a single line of code or changing the code of the software tools.

SUMMARY OF THE INVENTION

According to the present invention, these and other objects and advantages are achieved in a method and apparatus for automating and controlling execution of and modifying the behavior of tools and tool sets in a computer software system that includes a user interface, an operating system and one or more integrated software tools that perform predefined tasks and communicate with each other through events passed over an event server. The system is a when/then system, whereby "when" a specified event is detected, "then" a corresponding operation is initiated.

The method includes the steps of determining which tools are available for functionality connection, and presenting the tools to the user for user selection. Once the user selects a tool, the specific functions for the selected tool are presented to the user, so that the user may further select a specific function or event of the selected tool as the "when" event. After the user has selected the specific event that will be the "when" event, the user is presented with a list of tools to select from to represent the action tool for the "then" operation. Once the user selects a tool for the "then" operation, the specific functions for the selected tool are presented to the user, so that the user may further select a specific function of the selected "then" operation tool. The user may also select more than one "then" operation to follow a single "when" event.

After the user has created his routine, he may then name it, save it, and enable or disable it. Many routines of when/then tool sets may be created to meet the individual needs of the end user. Each routine is a file of operations. After the routines are created, they can be shown, modified, copied, deleted, renamed, enabled or disabled as the needs of the user change. Multiple active routines allow complex tasks to be automated such that one event from the operating system or any individual tool can start a long process of automatic tool interactions. Once different routines are enabled, a message connector registers the different "when" events for each routine and then waits for any of the messages to be heard. When the message connector hears the message for a "when" event, it sends out all of the "then" operation messages associated with the detected "when" event message.

In accordance with the present invention, the user is able to graphically select any tool, select the events that he desires to detect from that tool, and use that event to invoke any other software tool's functionality. This functionality connection is performed by users without any knowledge of software programming. Moreover, a user can also select a non-tool "when" event, such as elapsed time to activate a "then" operation. This task customization/automation of tool routines takes just minutes rather than the many person-months it used to take to write, test, and document a program. The present invention can also save many hours of multiple user/tool interactions to perform a single task.

BRIEF DESCRIPTION OF THE DRAWINGS

The above and other objects, features, and advantages of the present invention will be better understood by reading the following more particular description of the invention, presented in conjunction with the following drawings, wherein.

DETAILED DESCRIPTION OF THE PREFERRED EMBODIMENT

Figure 1:
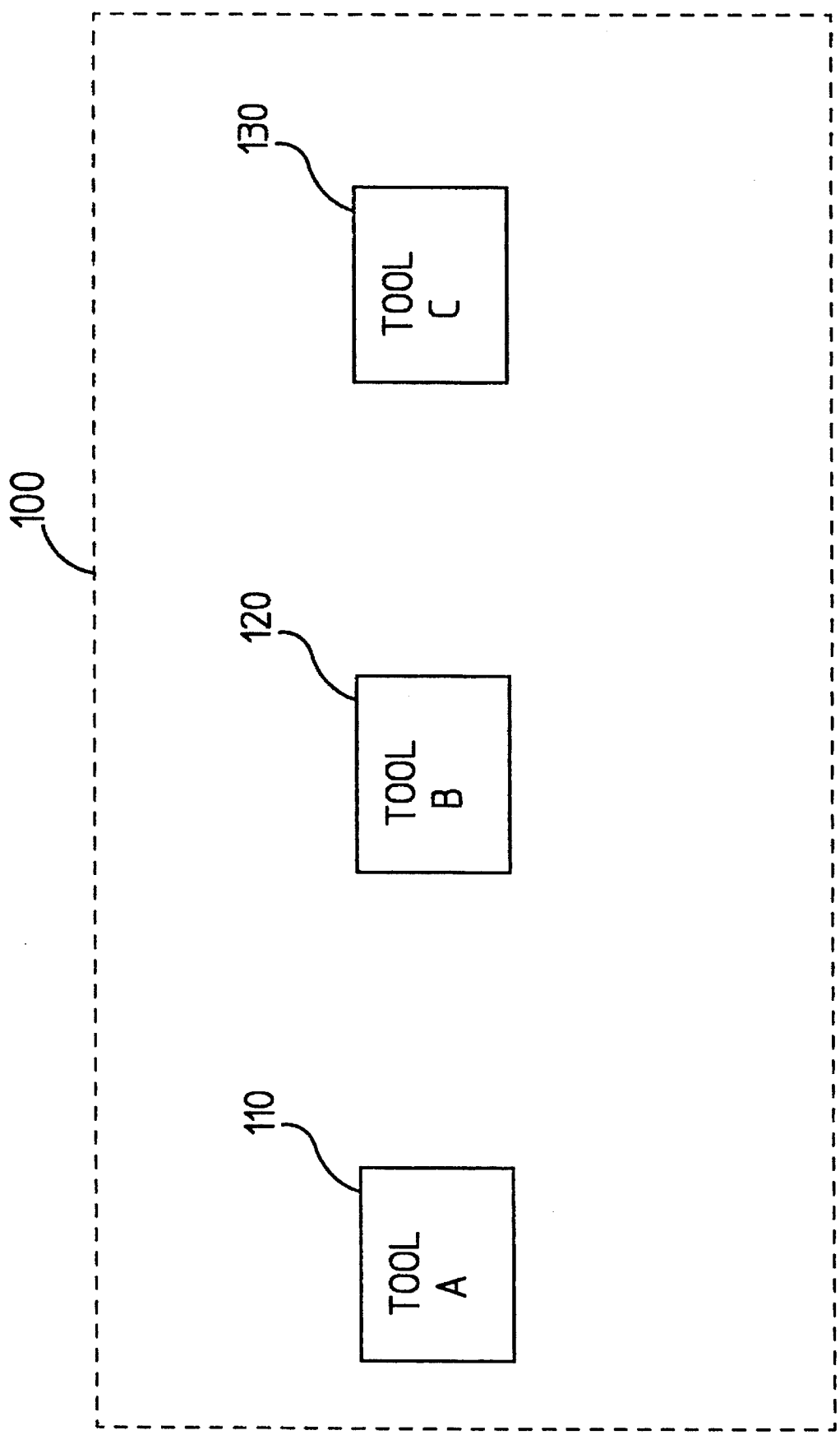
FIG. 1 shows a block diagram of a set of isolated application tools of a computer system.
Figure 2:
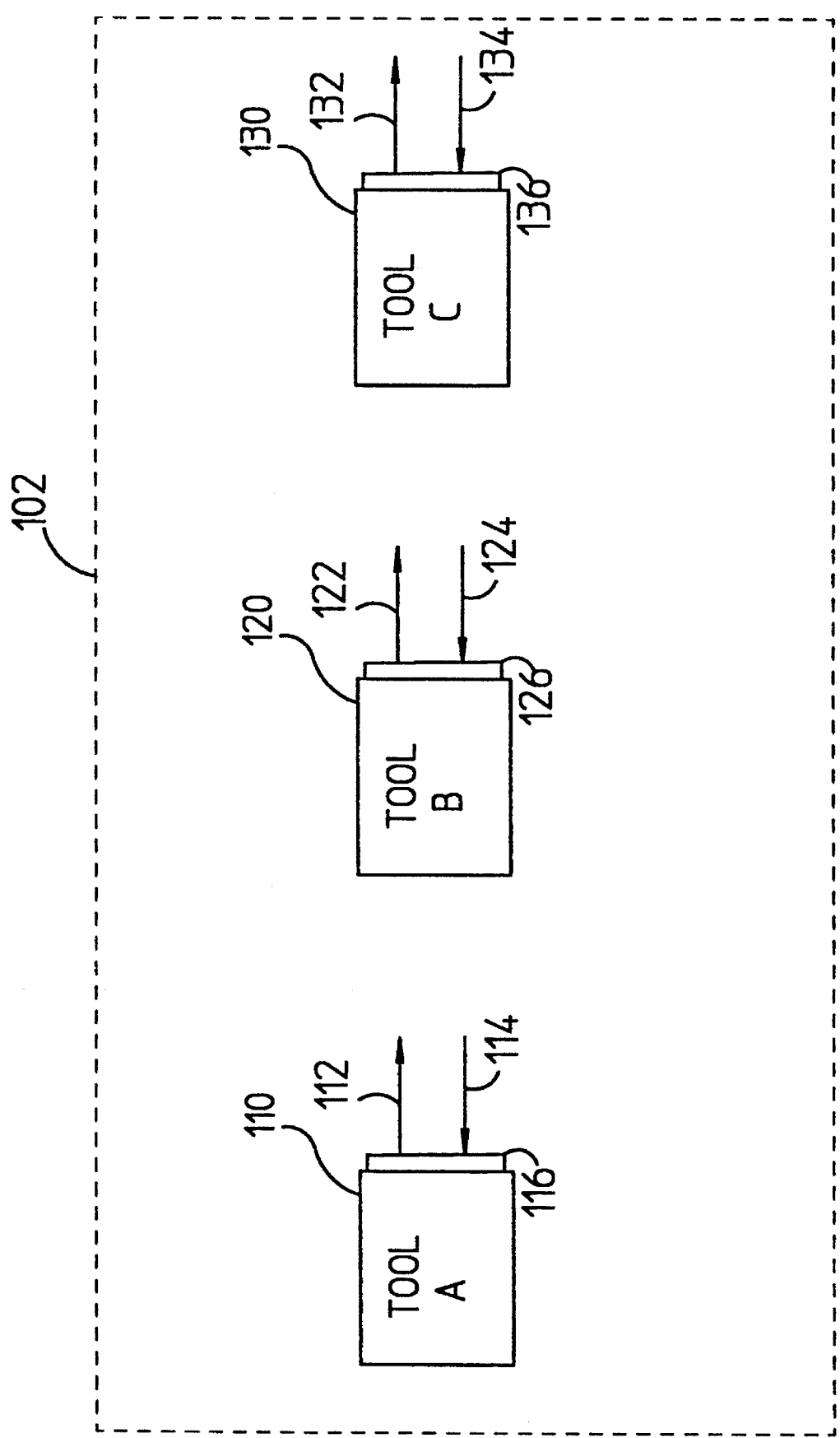
FIG. 2 shows a block diagram of a tool set with programmatic access to the functionality of each tool.
Figure 3:
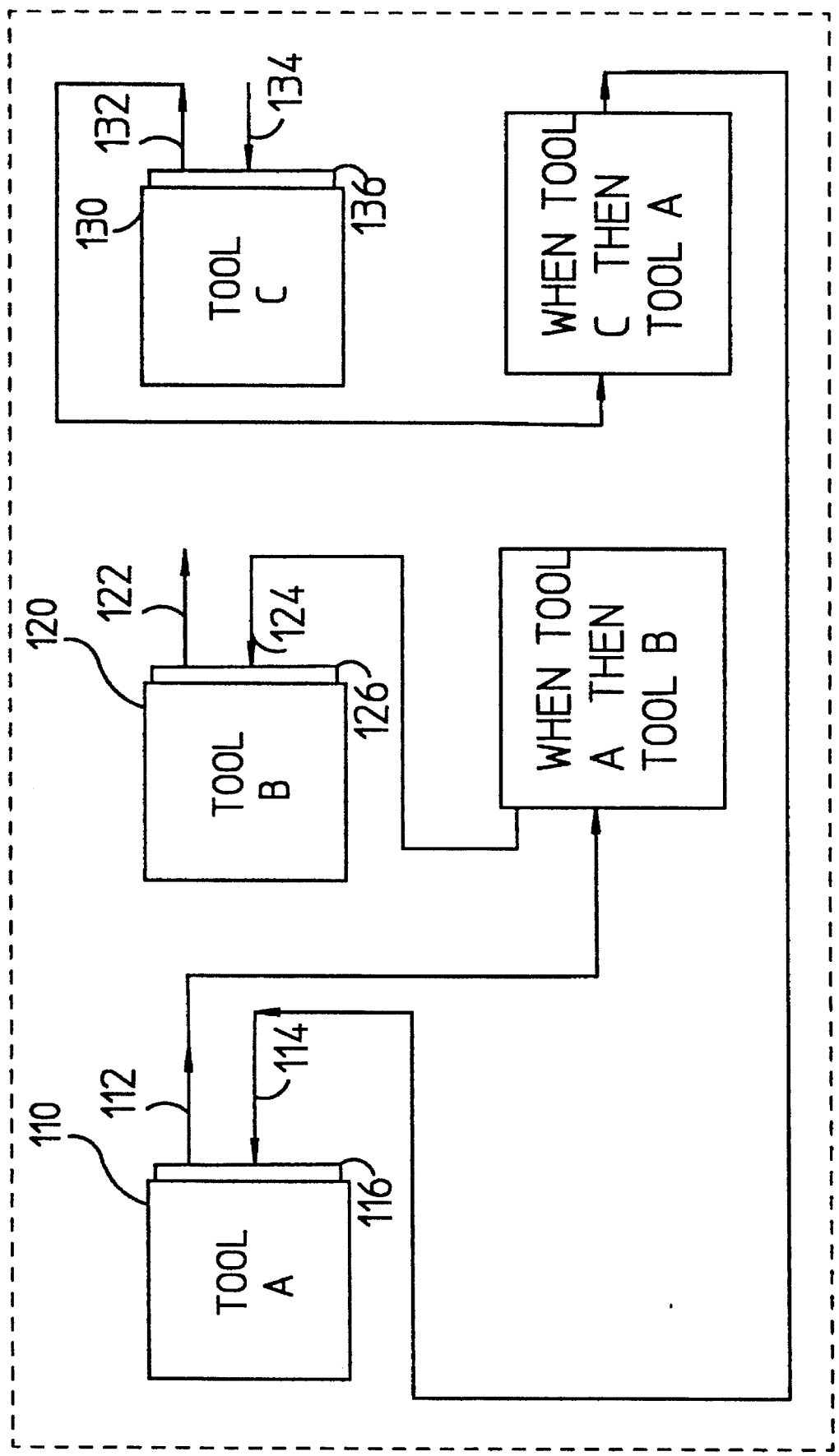
FIG. 3 shows a block diagram of a tool set with fixed connections between the functionalities of the different tools.

The method of tool integration of the present invention can be implemented on a single computer which runs all software application tools, including the message server and message connector, or in a distributed computing environment, in which one or more software tools run on different local or remote computers that are networked together.

As used herein, the following terms and phrases are defined as follows:

abstraction:
 a human language (ex. english, japanese, etc.) statement which replaces a computer statement for the purpose of clarity and understanding.

Concurrent:
 an operation that contains a list of other operations that are to be executed concurrently (simultaneously). The concurrent operation is considered to have completed when all of the operations that it contains have completed.

Disable:
 an operation that causes the specified routine to be immediately disabled, meaning that all threads of the specified routine will be immediately destroyed.

engine:
 that portion of the message connector which implements the actual when/then message interaction with the message server.

Enable: an operation that causes the specified routine to be immediately enabled, meaning that a thread of the specified routine will be started.

event:
 any packet of information which is sent by a tool and redistributed to other tools by a centralized event server.

event server:
 a program or process which redistributes events. A program or process which enables communication between software tools and supports via the sending and receiving of events. Examples include, but are not limited to, the Hewlett-Packard Broadcast Message Server, which is a trademark of Hewlett-Packard Company; the Sun ToolTalk Message Server, which is a trademark of Sun Microsystems Corporation; the X Windows System, which is a trademark of MIT; Microsoft Windows, which is a trademark of Microsoft Corporation; etc.

execution manager:
 a program or process which starts a tool to service a request, if the appropriate tool has not already been started.

log file:
 a file which contains the history of all when and then events of interest.

message:
 a type of event.

message connector:
 a tool which allows a user to automatically listen for events from other tools and respond to those events by requesting user specified functionality from other tools.

operation:
 a single step in a routine. The possible operations are WaitForRequest, WaitForNotify, SendRequest, SendNotify, Enable, Disable, and Concurrent.

pattern:
 a regular expression or series of regular expressions that define a search pattern. For example, *.txt is a pattern which would match all strings which end with the sub-string .txt.

pattern case:
 a list of patterns that will be matched against the events received and accepted by the WaitForNotify, WaitForRequest, and SendRequest operations. Each pattern has an associated list of operations which will be executed if that particular pattern matches the event.

pattern matching:

identifying of one of a predetermined set of items which has the closest resemblance to a given object, by comparing its coded representation against the representations of all the items.

raw message:

the specific computer semantic statement sent to or from a software tool.

routine:

a list of operations that the user wishes to be performed in order. At any point in time, a routine may either be enabled (executing) or disabled (not executing). When a routine is enabled, then one or more threads of that routine will be executing. When a routine is disabled, no threads of that routine will be executing.

RoutineList:

a special type of routine that contains a list of names of other routines instead of a list of operations. Enabling a routinelist causes the listed routines to be enabled. Disabling a routinelist causes the listed routines to be disabled. The routinelist itself is never in an enabled or disabled state, since it contains no operations to execute.

SendNotify:

operation that sends the specified notification event to the event server.

SendRequest:

operation that sends the specified request event to the event server, and then optionally waits for the associated notification event that will be generated when the request event is serviced by another tool in the environment. This notification event may then be matched against pattern cases in a manner similar to WaitForNotify.

strings:

a sequence of characters (e.x., an english sentence, "mydata.txt", "this is a string", etc.).

then operation:

a user specified response to a when event, most likely a request to execute a function from another tool.

thread:

an independently executing copy of a routine.

thread tree interpreter:

code which executes the operations described by a given thread's tree structure.

thread tree structure:

data structure representing the routine being executed by the given thread.

thread variable structure:

data structure that contains the variables being used by a given thread.

tool:

software programs for performing a pre-defined function or set of functions.

WaitForNotify:

an operation in a routine which causes execution of the routine thread to stop until a notification event matching the one specified in the WaitForNotify operation is received from the event server. Each WaitForNotify operation may provide a list of pattern cases to specify more than one possible match for an event. Each particular pattern may then be associated with its own list of operations which will be executed whenever that particular pattern case occurs.

WaitForRequest:

an operation that is identical to WaitForNotify, except that a request event may be triggered on instead of a notification event. This operation is only useful if the particular event server being used has the concept of a request event and supports eavesdropping on them.

when event:

a description of the event for which the message connector is listening or waiting.

Figure 4:
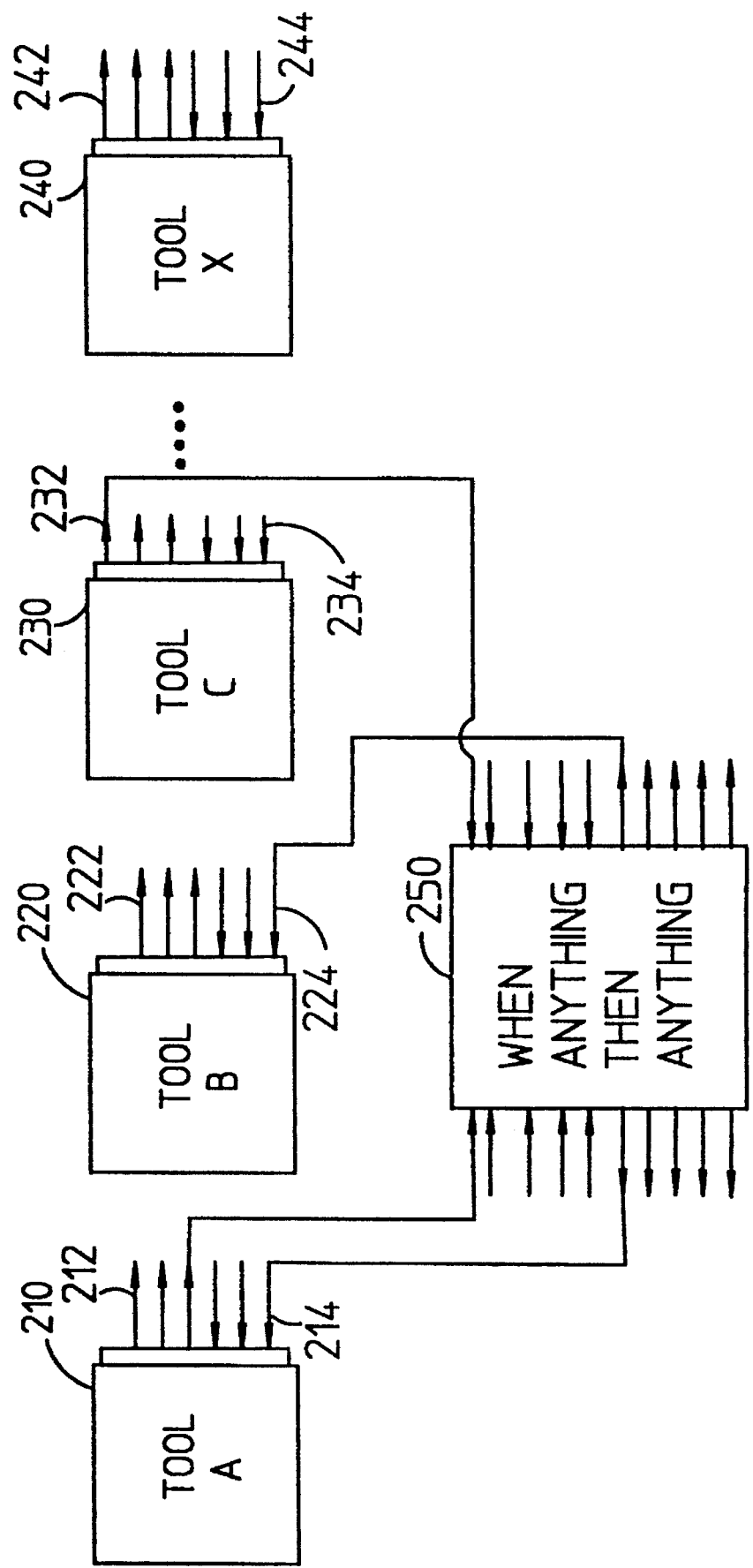
FIG. 4 shows a block diagram of a tool set with flexible integration between tool functionalities via a message server according to the present invention.

FIG. 4 shows a block diagram of a tool set, consisting of tools A, B, C, ... X, with flexible, user defined integration between tool functionalities according to the present invention. Element 250 comprises a message connector and an event server which preferably includes a trigger mechanism wherein an event occurring in the system, typically by some event originating in another tool, for example, tool A 210, invokes a specific functionality in another tool, for example, tool C 230. The trigger mechanism is user programmable and creates a cause and effect relationship, referred to herein as a when/then routine. The trigger mechanism can be used to automatically trigger actions upon the occurrence of specified events without user intervention. It should be noted that although the cause and effect relationship is user programmable, the user does not write a single line of code. Moreover, the code of the individual tools is not changed.

Different programs interact to provide event-driven communication and execution of software tools. When a notification message generated by a first tool is sent to a second tool via the message connector 250 and event server, event-driven triggering of the second tool is achieved. For example, when a notification of a successful completion from a text edit tool is sent to the event server and then forwarded to the message connector by the event server, the message connector can then request that the build tool be invoked. An event may then be sent to the event server that the build tool has been initiated, which may in turn cause the message connector to request the user's electronic mail to be displayed. In this manner, software tools are invoked upon the occurrence of events that are communicated by appropriate notifications, requests, events, and/or messages, thereby enabling close interaction between the software tools without real-time user intervention.

Figure 5:
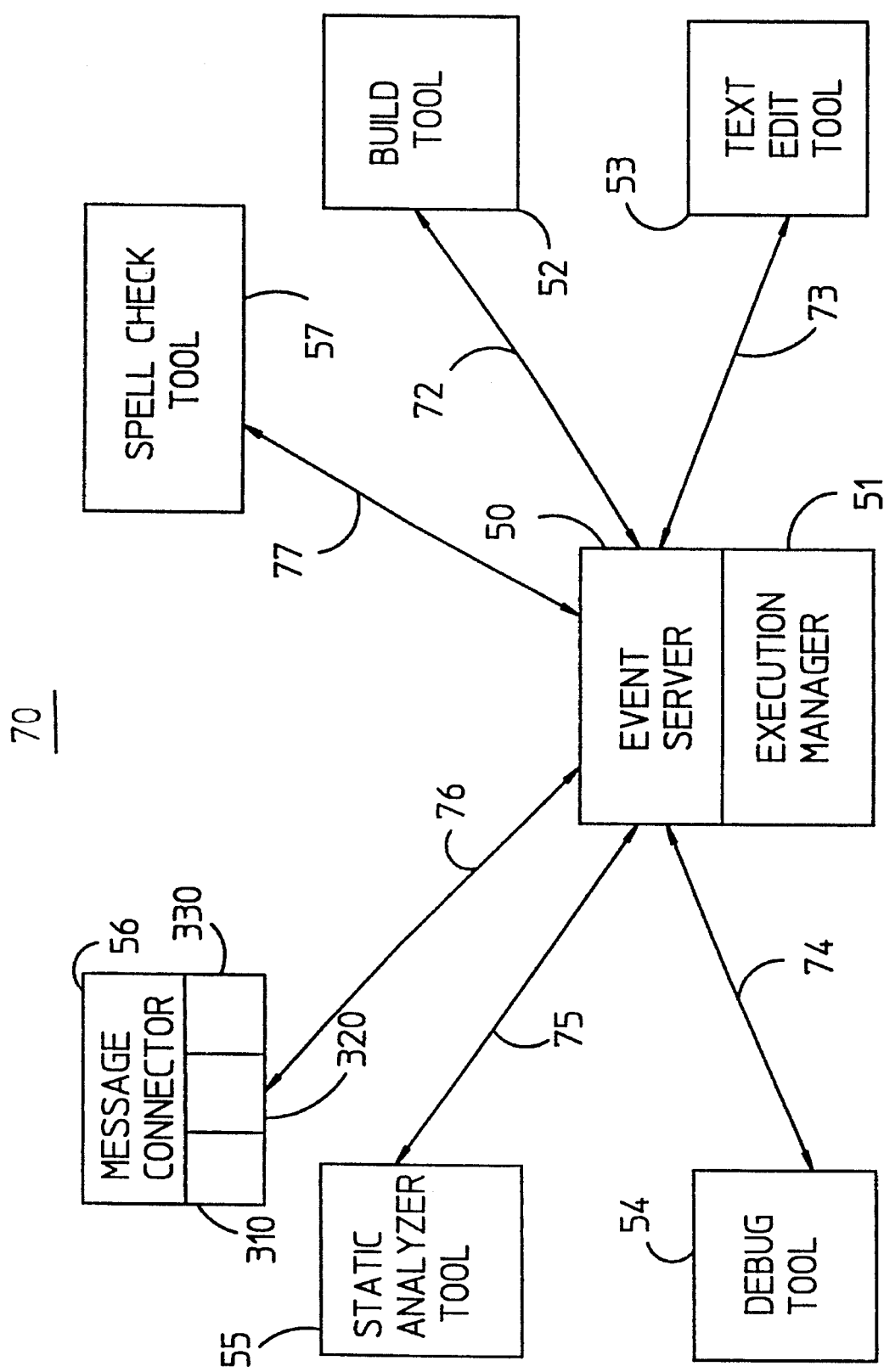
FIG. 5 shows a conceptual block diagram of a computer environment illustrating the bi-directional communication paths established between the message server and the message connector and the various software tools in accordance with the present invention.

FIG. 5 is a conceptual block diagram of a computing environment 70 in which an event server 50 functions as a central event distribution mechanism among a plurality of software tools 52–57. The tools of the environment include, by way of example only, build tool 52, edit tool 53, debug tool 54, static analyzer 55, message connector 56, and spell check 57. Computing environment 70 can be implemented with a single computer on which event server 50 and software tools 52–57 are executable. Alternatively, computing environment 70 can be implemented in a distributed computing environment in which event server 50 and software tools 52–57 run on different computers. In the anticipated best mode, multiple software tools operating in the Hewlett-Packard SoftBench framework with Hewlett-Packard's Encapsulator used to bring the tools into the framework and Hewlett-Packard's Softbench Message Server used as the event server, in which case the events used are referred to as messages. Any computer that runs Hewlett-Packard's Softbench products can be used in the present invention. For further information regarding the message server system, see the aforementioned U.S. Pat. No. 5,212,792 entitled "Method and Apparatus for Controlling Execution of Tools in a Computer-Aided Software Engineering System."

In order for one software tool to communicate with other software tools, a bi-directional communication path or socket must first be established between each software tool and the event server 50. A socket is a bi-directional, point-to-point communication path. As shown in FIG. 5, a socket 72 is established between build tool 52 and even server 50. In a similar manner, sockets 73, 74, 75, 76, and 77 are established between tools 53, 54, 55, 56, and 57, respectively, and the event server 50.

All communication with other tools takes place through a message connector tool 56 and the event server 50. Message connector 56 comprises a routine manager 310, a routine editor 320 and an engine 330, which will be discussed below with regards to FIG. 6. The message connector 56 has a list of rules which include the user defined "when-then" routines. The message connector 56 listens for any of the predefined "when" events. Upon hearing a "when" event, the message connector 56 then sends requests and/or notifications to the event server 50 for all the "then" events associated with the "when" event that was detected. The event server 50 then forwards the requests to the appropriate tool(s). In the best mode, if the tool being requested has not already been started, the execution manager 51 starts the tool. Communication between tools through message connector 56, execution manager 51, and event server 50 is thus driven by events occurring in each of the tools.

An example of an event-driven communication described above starts with the user saving a file in the edit tool 53. The text edit tool 53 sends a notification message to the event server 50 stating that a file has been saved. The message connector 56 has informed the event server 50 to forward all such notifications to the message connector 56. The event server 50 forwards the edit tool's notification to the message connector 56. The message connector 56 knows that spell check 57 is to be run every time the test edit tool 53 saves a file. Accordingly, the message connector 56 requests that the event server 50 forward a event to the spell check tool 57 to begin. The execution manager 51 will first check to make sure the spell check tool 57 is running and ready to take events. If the spell check tool 57 is not running, the execution manager 51 will initiate the spell check tool 57. Then the event server 50 will send the request to the spell check tool 57 to check the file. The spell check tool 57 will then carry out the request and may send a notification back to the event server 50 when finished. This event notification from the spell check tool 57 may then launch one or more other event driven operations in other tools.

Figure 6:
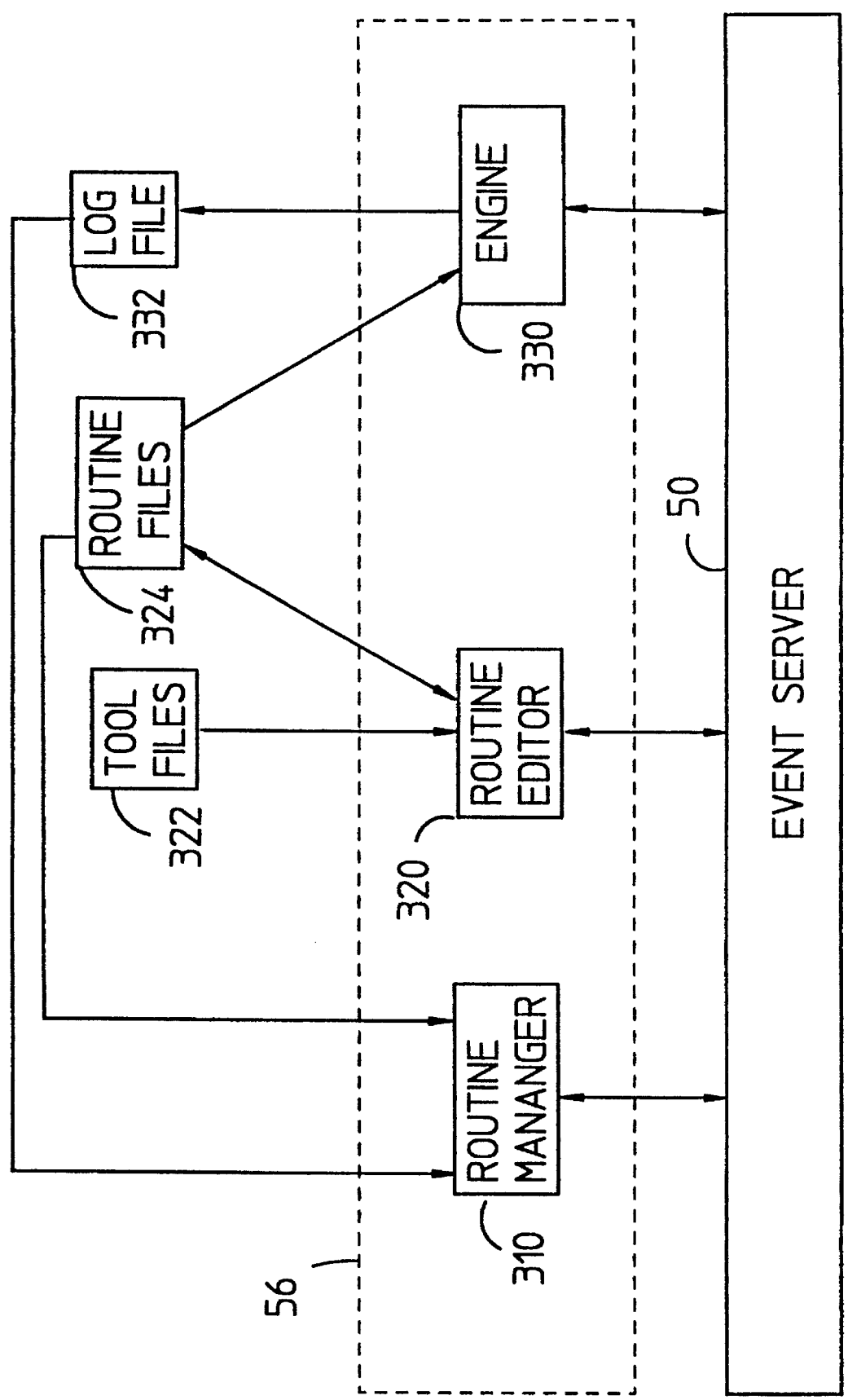
FIG. 6 shows a block diagram illustrating routine creation, storage, and communication with the message server according to the present invention.

FIGS. 6 shows a high level block diagram of communication with the event server 50. Through a simple menu interface, the user can change his tool environment as often as necessary to support new work assignments or automate new tool interactions. According to the present invention, the above is achieved by the user creating routines, which are sets of messaging operations connecting tools together to perform a desired task. These routines are based upon a when/then relationship . . . when this event occurs, then cause this event to take place. The user can accomplish this without writing any code or changing the tools themselves.

Figure 7:
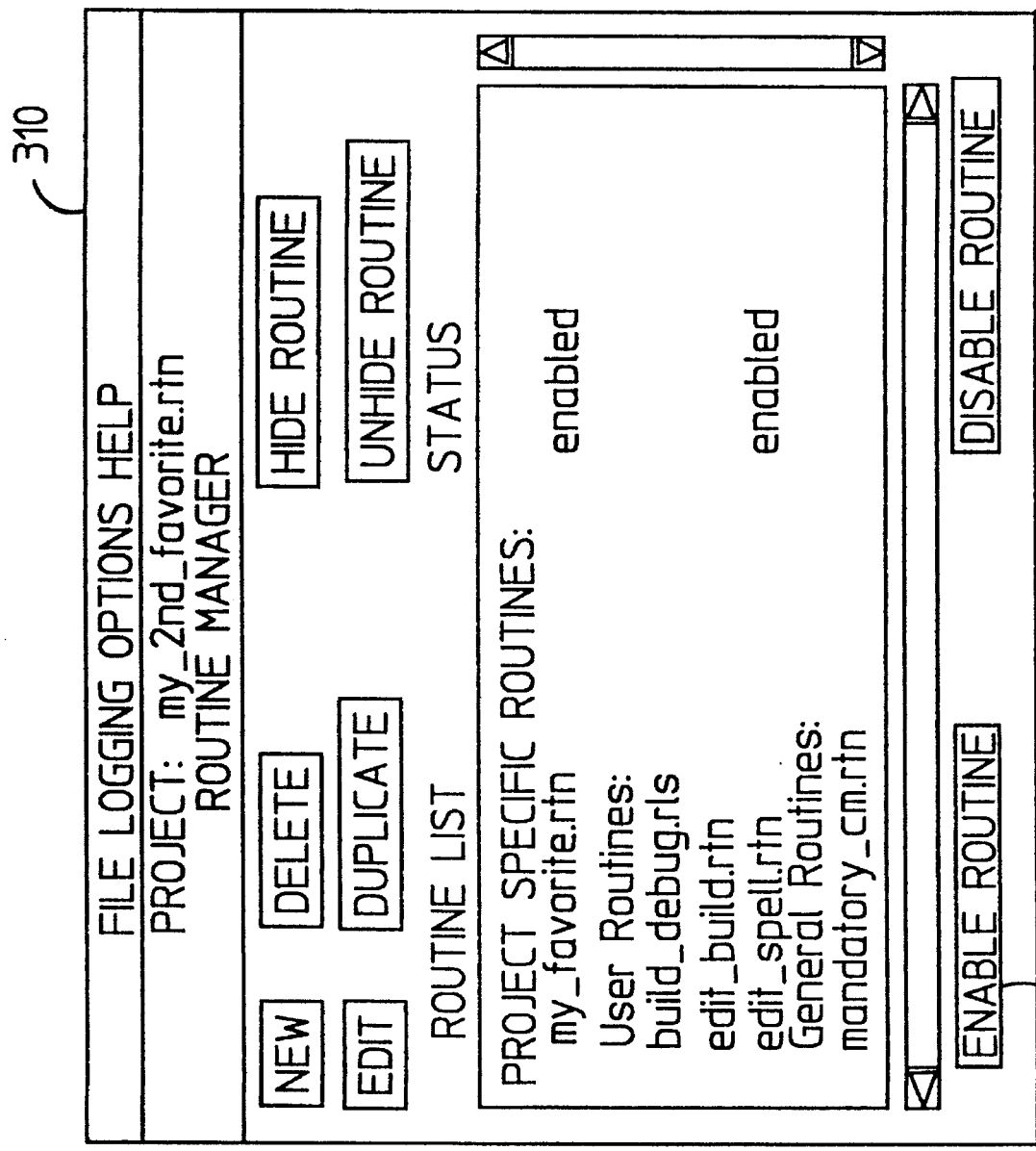
FIG. 7 shows an example of a user interface window display for a tool routine manager interface according to the present invention.
Figure 8A:
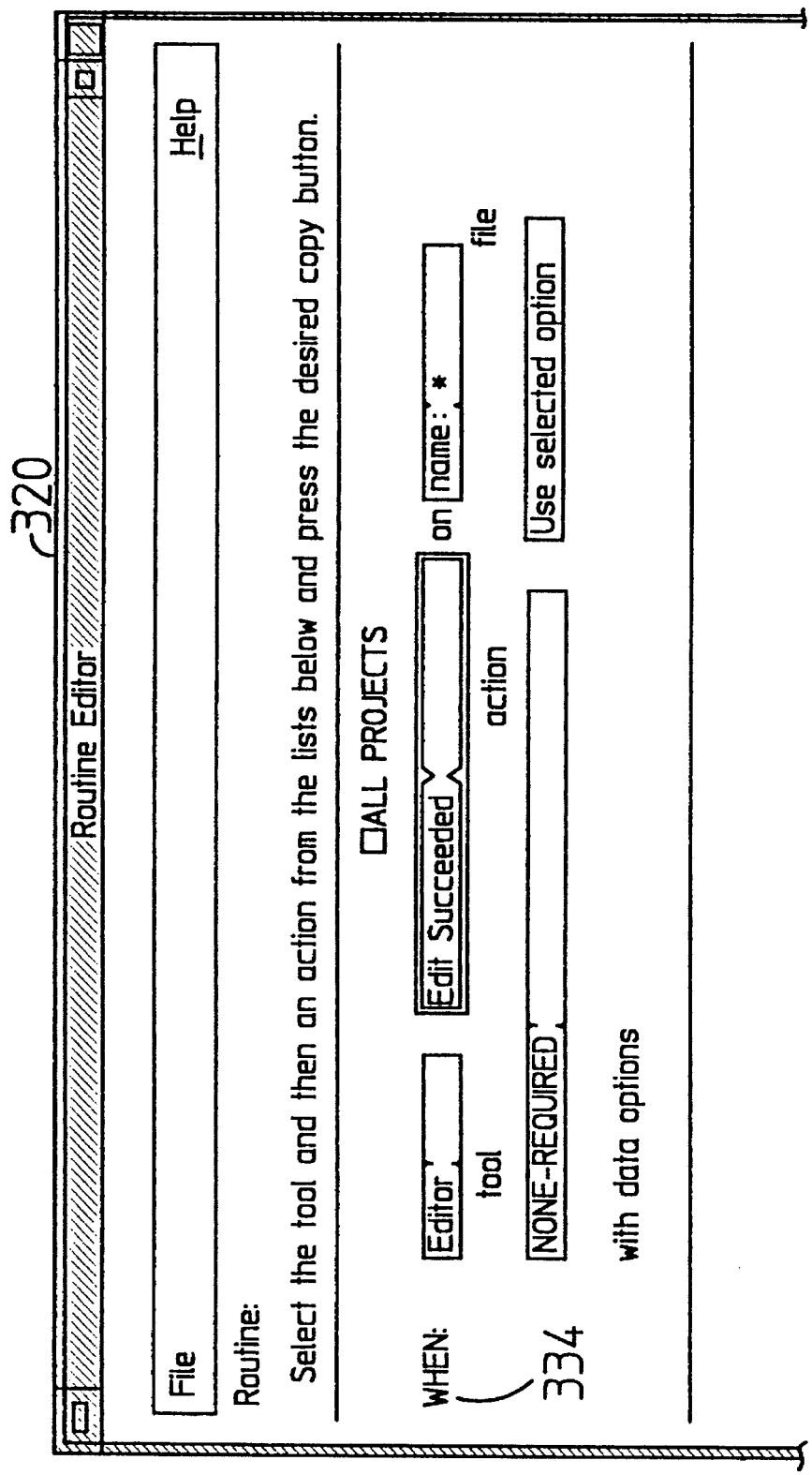
FIGS. 8A and 8B together show an example of a user interface window display for a tool routine editor interface according to the present invention.
Figure 8B:
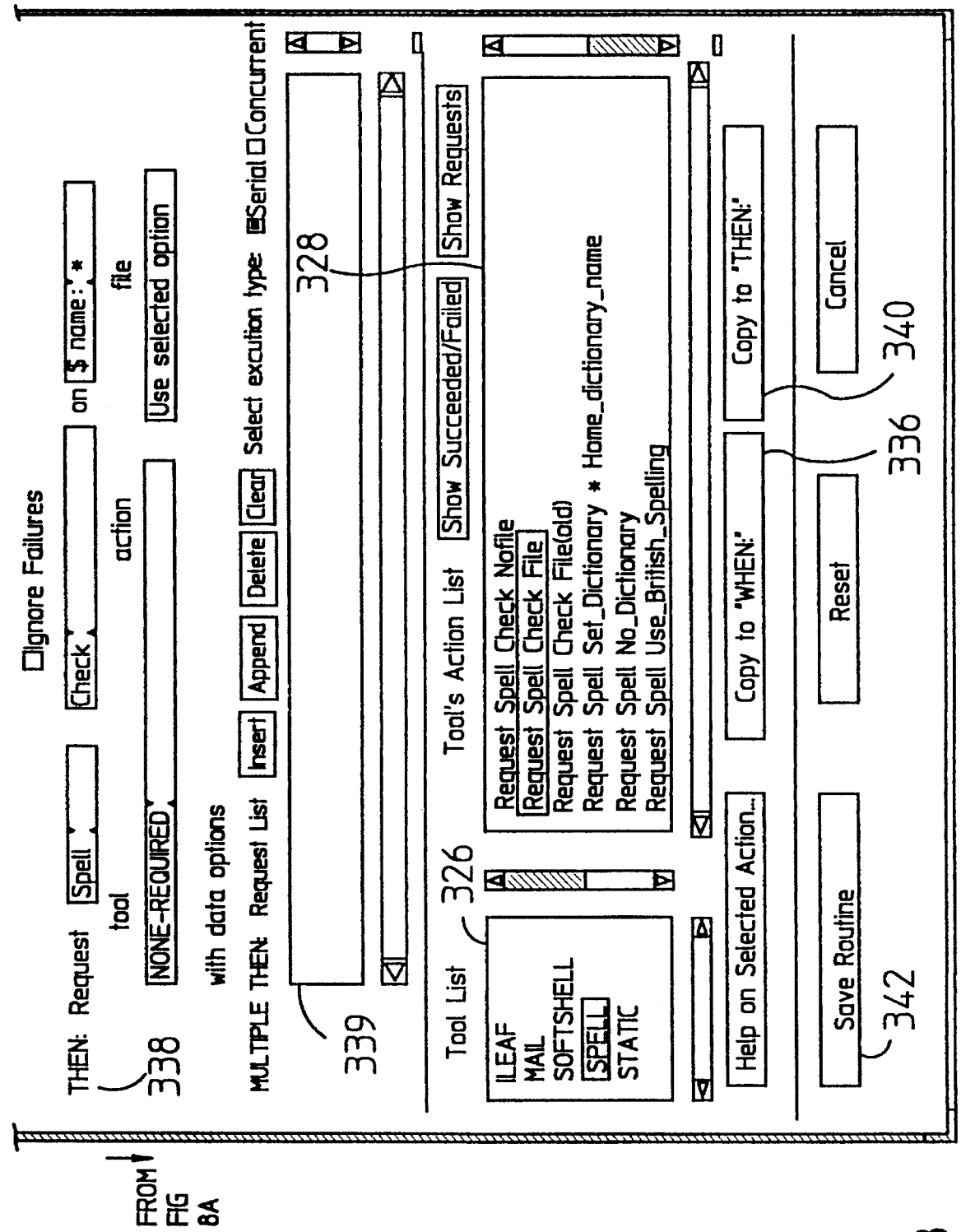

To create routines, the user starts at a top level user interface 310. An example of a top level user interface for this purpose is shown in FIG. 7 as routine manager window 310. From this window, the user selects either the "new" or "edit" button and the message server will bring up the routine editor window 320 as shown in FIG. 8. The routine editor 320 has access to tool files 322 (FIG. 6) and displays the available tools to the user through tool list 326. After the user has created his routine, he will save the routine to the routine files 324 (FIG. 6), return to the routine manager window 310 and enable the routine if desired at that time by clicking on the "Enable Routine" button. The engine 330 reads the enabled routine and establishes a connection for the "when" event with the event server 50 so that all such when event messages are forwarded to the engine 330 by the event server 50. The engine 330 maintains a log file 332. The engine 330 writes to the log file 332 a transcript of all actions performed by the engine. This allows an event history to be maintained.

Figure 9:
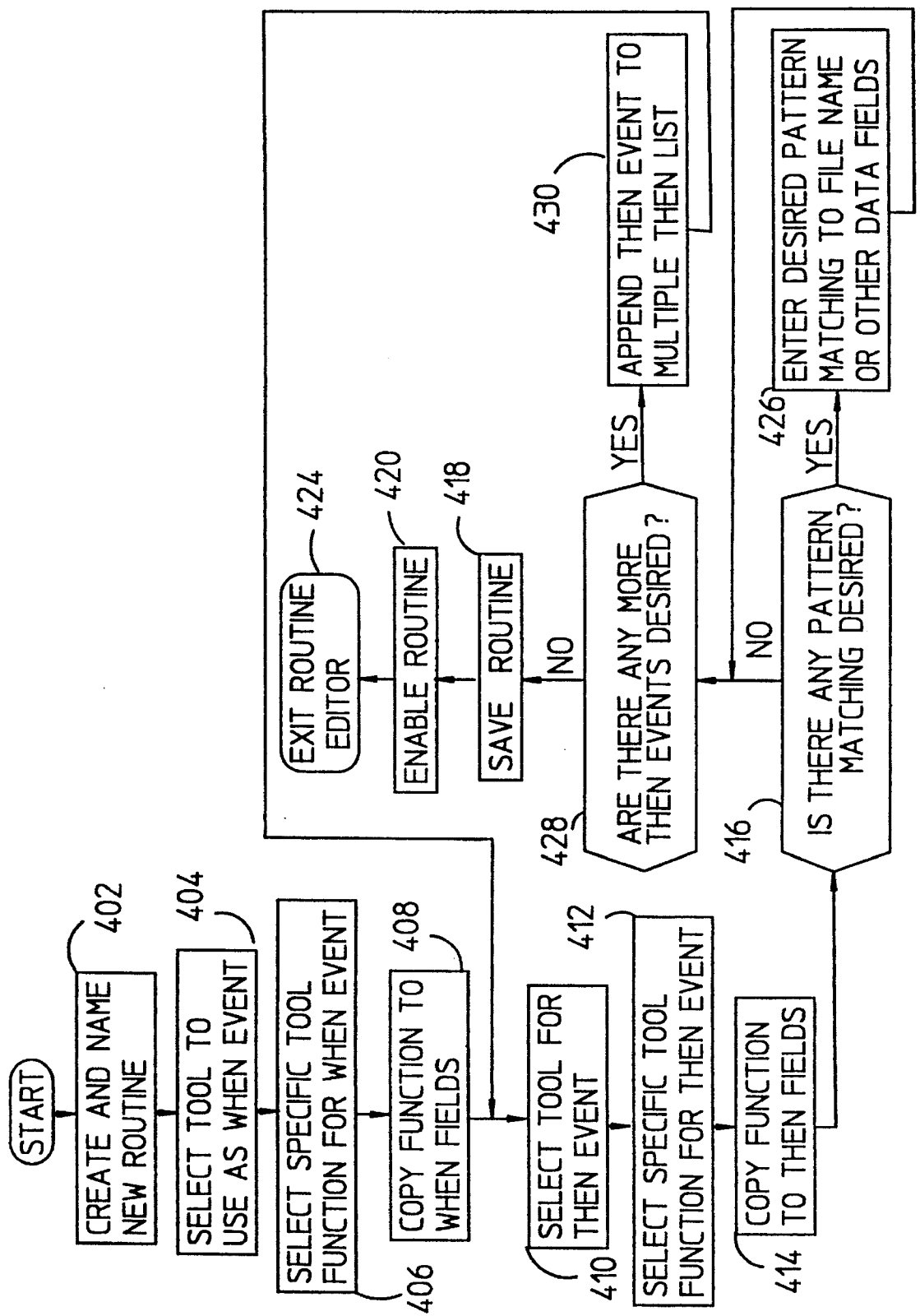
FIG. 9 shows a flow diagram illustrating an example of a user's steps in creating a routine according to the present invention.

FIG. 9 shows a flow diagram illustrating an example of the user creating a routine, which will be explained with reference to FIGS. 7–9. The creation of a new routine begins at box 402 with the user selecting the "new" button in the routine manager window 310 and naming the routine, which, in the present implementation occurs in the routine manager window 310, but also can occur in the routine editor window 320. After naming the routine, the routine editor window 320 will be brought up. The user will then select a tool to use as the tool for the "when" event 404 from a list of available tools 326. After the user selects a tool to use as the "when" event, the routine editor window 320 will list the specified tool's actions in a tool's action list 328 and the user will select a specific tool function for the "when" event 406. It will be apparent from FIG. 8 that a tool's action list (list of functions) is displayed to the user as a human abstraction, rather than as a raw message. The user then copies the tool and the specified function to the "when" field 334 by clicking on the "Copy to 'WHEN'" button 336. The user selects a tool 410 for the tool for the "then" event from the tool list 326 and at block 412, a specific action of the tool from the tool's action list 328 is selected. Next, the user copies the selected tool and the specified function to the "then" field 338 by clicking on the "Copy to 'THEN'" button 340. The user may also apply any pattern matching to the file that he desires, such as "only respond to files which begin with the two letters 'ab'", or "only respond to files which end with '.txt'". The user may also apply pattern matching to any of the data parameters of the message. The user may also save any field which actually matches a pattern to be used later in the routine.

At this point 428–430, the user can specify multiple "then" events that are triggered by a single "when" event by appending the "then" event to the multiple "then" list 339 (clicking on the "Append" button in the multiple then area) and repeating steps 410–416 in Figure. The multiple "then" events can be executed sequentially or concurrently by clicking on either the "serial" or "concurrent" buttons, as the user desires. Once the user is satisfied with the routine he has created, he moves to block 418 on the flow diagram and saves the routine by clicking the "Save Routine" button 342, which will return the user to the routine manager window 310, where the user can then enable the routine by clicking the "Enable Routine" button, if desired. If a routine is enabled, the word "enabled" will be displayed next to the routine in the routine manager window 310. At this point, the user will exit the routine manager window 310 and continue with his computer session 424.

Figure 10A:
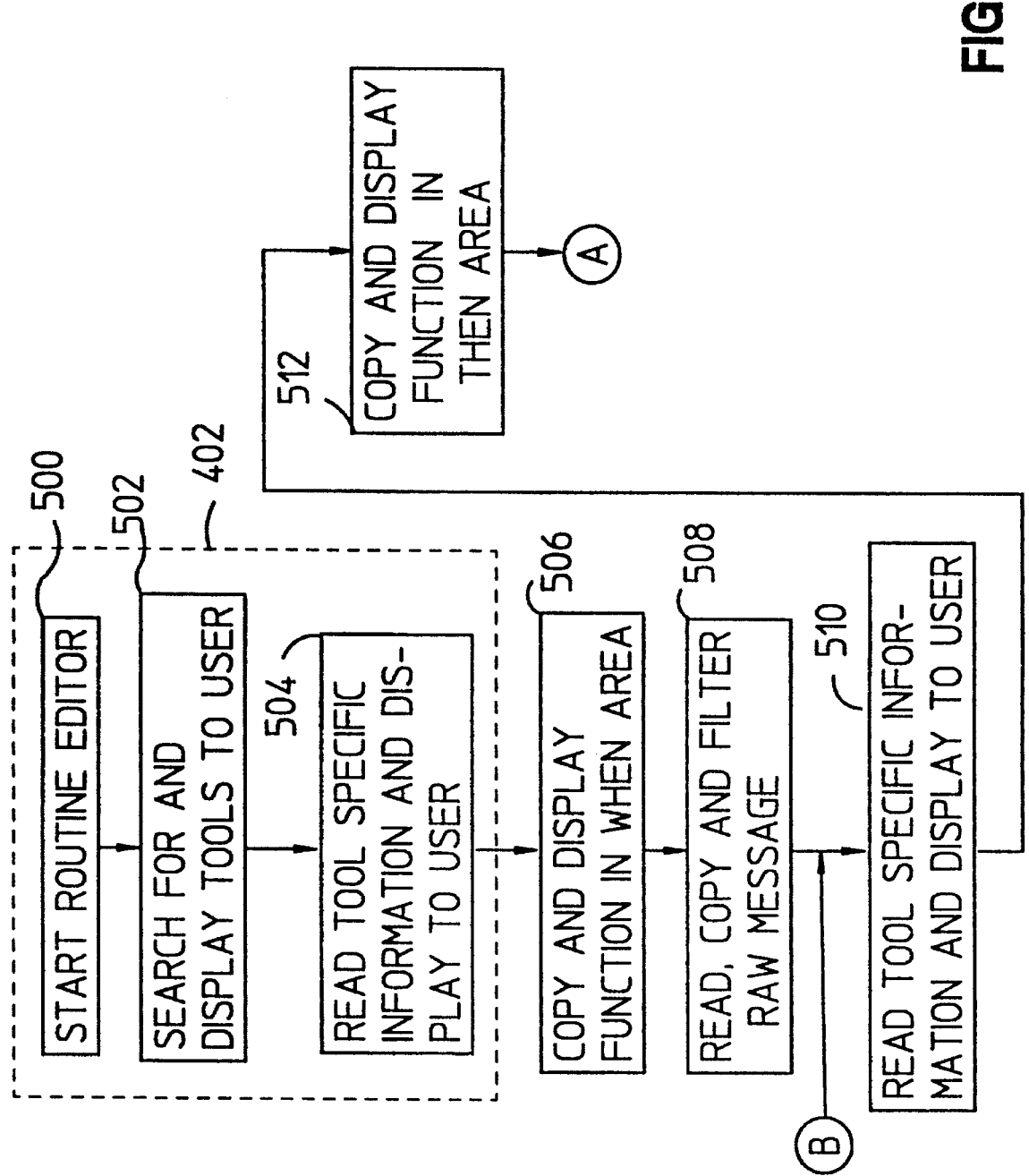
FIG. 10A–10B show a flow diagram illustrating the internal system's steps used to create new routines in accordance with the present invention.
Figure 10B:
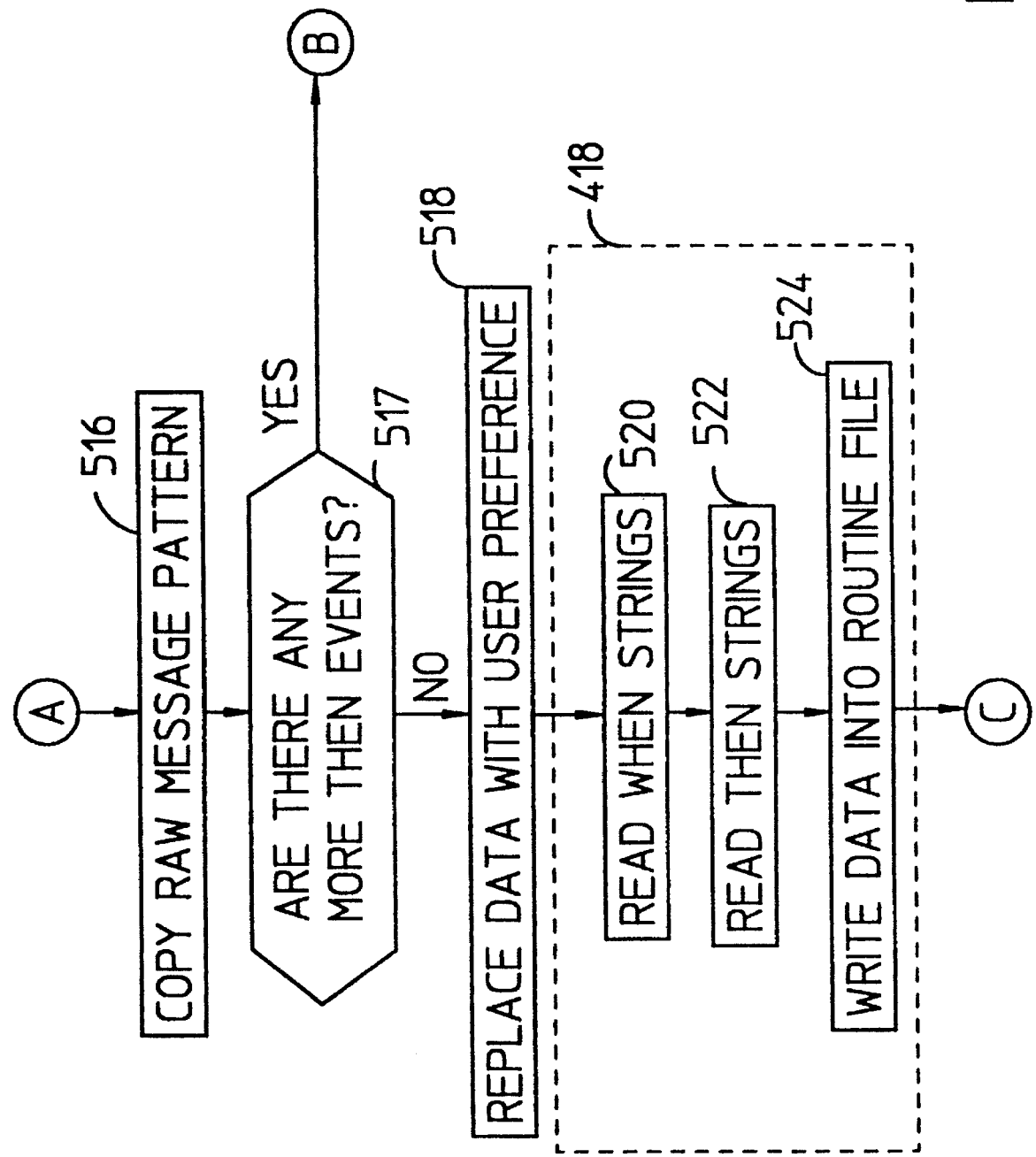
Figure 10C:
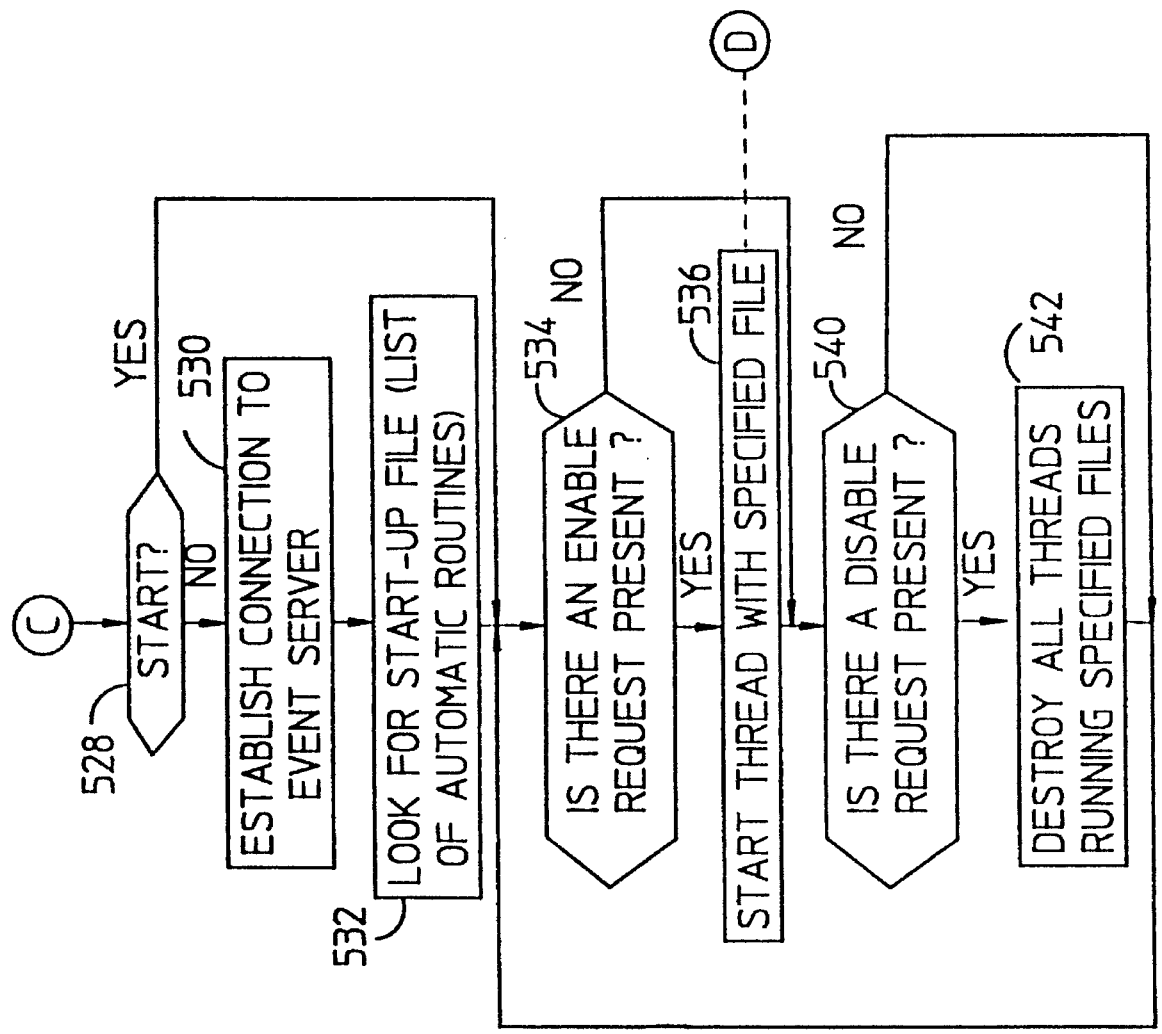
FIG. 10C–10E show a flow diagram illustrating the internal system's steps used to enable a previously created routine in accordance with the present invention.
Figure 10D:
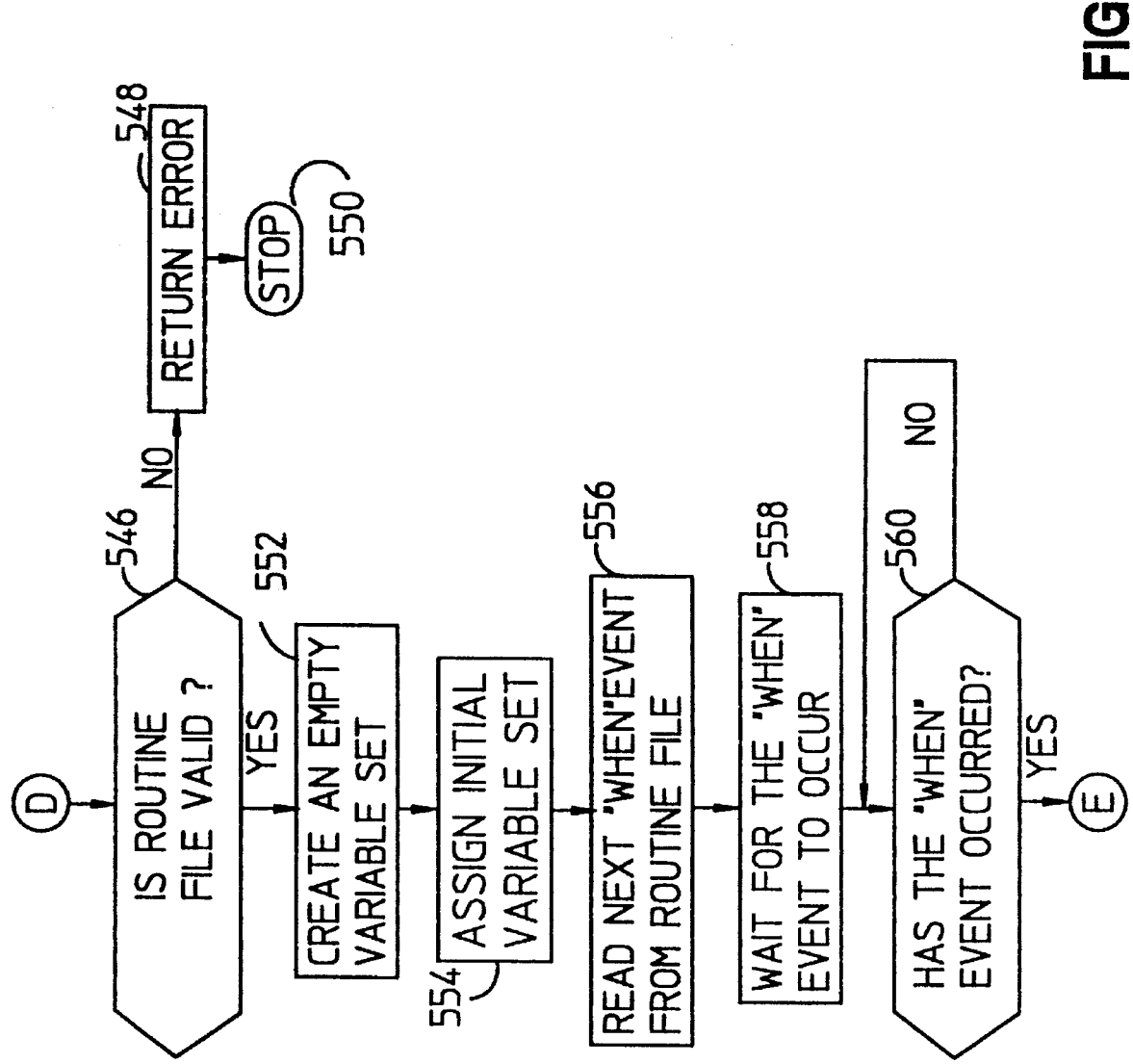
Figure 10E:
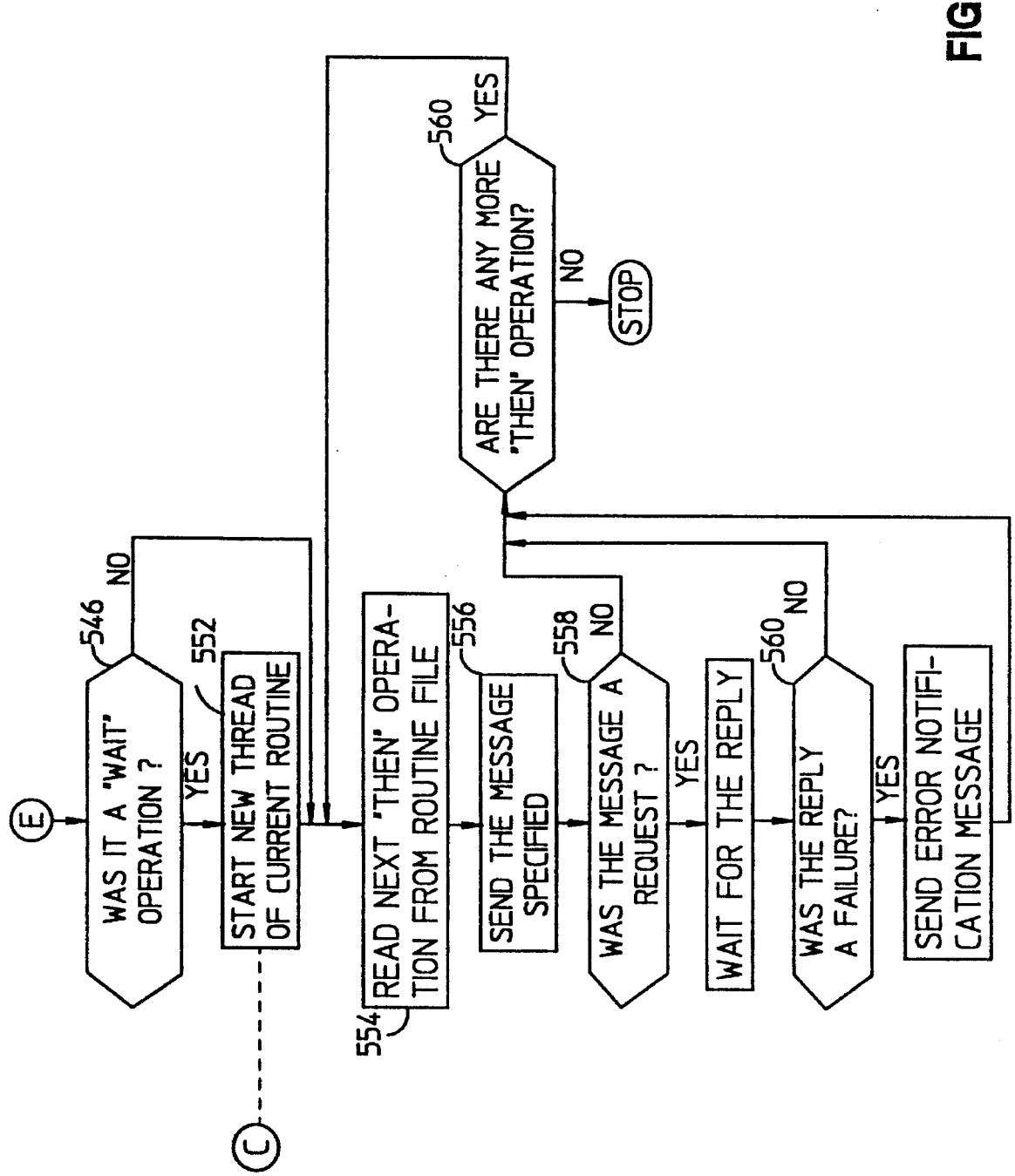

FIGS. 10A–10B illustrate a flow diagram of the internal process occurring during the creation of a new routine according to the present invention. When the user begins to create and name a routine 402, the routine manager 310 will start the routine editor 320 and search for and display the available tools to the user (blocks 501 and 502). When the user selects a tool as the tool for the "when" event, the routine editor 320 will read tool specific information and display the information to the user in the tool's action list area 328 of the routine editor. Next at block 506, when the user selects a specific tool event for the "when" event and clicks the "Copy to 'WHEN'" button 336, the routine editor will copy and display the selected function in the "when" area and then copy the raw message pattern associated with the tool function selected at block 508. It should be noted that the user only sees human language abstractions in the routine editor window, which represent the tools and tool functions in human readable form.

Next the user will select a tool for the "then" event tool, and the routine editor will read tool specific information and display the information to the user in the tool's action list area 328. When the user selects a specific tool function for the "then" event and clicks the "Copy to 'THEN'" button 340, the routine editor will copy and display the function in the "then" field 338 as well as copy the raw message pattern associated with the tool function selected. Next, if the user desires to add any pattern matching to the file name or data, such as "only respond to files beginning with 'A'", the routine editor will replace the default information with the user's preference. If the user has any additional "then" events, the routine editor will repeat these steps as necessary.

When the user clicks the "Save Routine" button 342, the routine editor will read the "when" strings from the display and the raw message pattern which was copied earlier to a temporary memory location, read the "then" strings from the display and the raw message patterns copied earlier to the temporary memory location, and write the temporary memory location data into a routine file. Note again, that the user sees a human abstraction of the raw messages. Accordingly, the user does not need to know any computer code or how to program a computer. The user also does not need to understand the implementation of raw messages. The Routine Manager and Routine Editor walk the user through the process of creating custom tool interaction routines. It should also be noted that the user does not change the code of the software tools, but modifies the behavior of the tools by use of the message connector of the present invention.

The flow diagrams 10C–10E illustrate the process that the engine 330 initiates once the user clicks on the "Enable Routine" button 311 in the routine manager window 310. First, at block 528, if the engine is not already started, it will establish a general connection with the event server 50 and then look for a set of start up routines (list of routines the user would like to enable automatically). Next, the engine 330 listens for the enable requests. When an enable request is detected, the engine will start the thread with the specified file to be enabled and determine whether the file is valid. If the file is not valid, the engine will return an error and stop. If the file is valid, the engine will create an empty variable set, which represents a location to place any pattern matches the routine may require. The engine will then assign an initial variable set, which represents initial values assigned for common, useful implementation-dependent strings.

The engine then reads the "when" event from the routine file and listens for the specified "when" event to occur. Upon the detection of a specified "when" event, the engine determines whether it was a "wait" operation, in which case the engine starts a new thread of the current routine. Otherwise, the engine reads the corresponding "then" event(s) and sends the specified message(s) to the event server. If the message is a request, the engine waits for a reply. If the reply is a failure, the engine sends an error notification message to the message server. Finally, the engine checks to see if there are any more "then" operations associated with the detected "when" event. If there are any, the engine reads the next "then" event(s).

ENGINE

The present invention provides a method for a user to easily automate and control the execution and integration of software tools without having to write any code. To this end, the routine manager and routine editor have been described herein above. Another important component of the present invention that enables the above stated objectives to be achieved is the engine 330 as shown in FIG. 6. The engine 330 is connected to the event server 50 and to the other software application tools 52–57 through the event server 50. The engine utilizes the event server 50 to monitor events produced by the software tools, determine which events are of interest and execute routines based upon events and event contents in order to change the behavior of the software tools without changing the software tools themselves.

It should be noted that within the engine, zero, one, or more routines can be concurrently executing. When a copy of a routine is active and executing, it is called a thread. The engine 330 can (1) wait for events, or (2) produce other events, which through the event server 50 can effect behavior in one or more of the software tools. The engine 330 can also (3) instigate concurrent execution of other sequences of operations, (4) activate or deactivate sequences of operations, or (5) cause concurrent execution of any combination of (1), (2), (3), (4), or (5).

Figure 11:
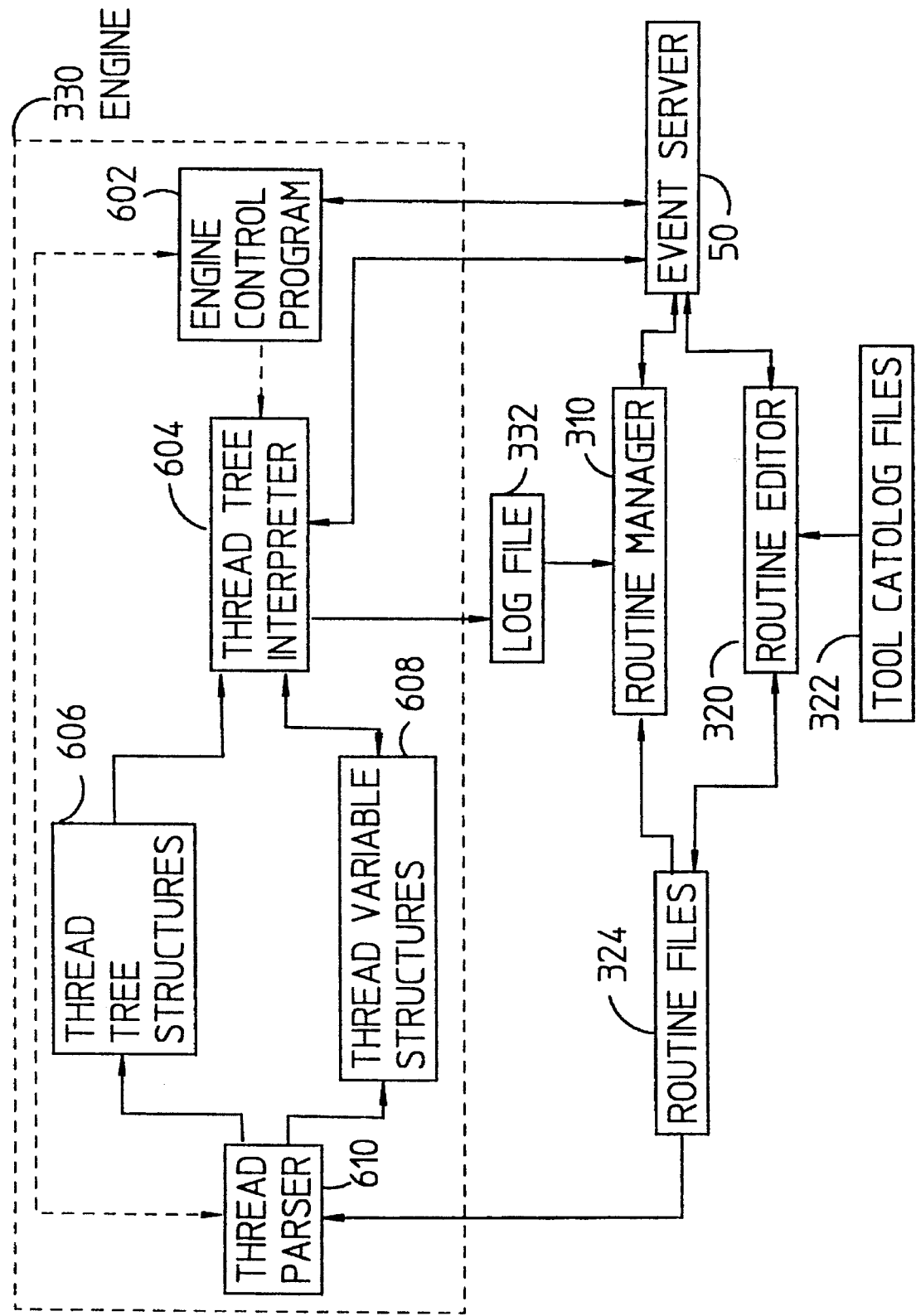
FIG. 11 shows a block diagram illustrating the internal operation of the engine and the other components of the present invention.

The engine will be described more particularly now with reference to FIG. 11. The engine 330 includes a thread parser 610, thread tree structures 606, thread variable structures 608, a thread tree interpreter 604, and an engine control program 602.

The engine 330 communicates with the computer operating system in the same manner as any standard application tool. In accordance with the present invention, the engine 330 is easily generated utilizing routine files 324. The routine files 324 permit the user to define communication with the individual application tools and between the application tools. The routine files 324 are used by the thread parser 610 to develop thread tree structures 606 and thread variable structures 608. The Backus Naur Form for the description of all possible routine file formats according to the present invention is attached hereto as Appendix A.

The following is an example of a routine file for the spell check tool:

```
StandardRoutine("SB-MCROUTINE") // Spell_Check.mcr
{    // OpArray
    WaitForNotify ("Editor Edit Succeeded: name:
       * NONE-REQUIRED"
"EDIT" "$HOST" "$DIR" "name":"*" "WINDOW"
"PASS")
    {    // DataCaseArray
            DataCase("*")
            {    // OpArray
                SendRequest("Spell Check $name NONE-
                    REQUIRED" "SPELL"
"CHECK" "$name" " ")
                {    // ReplyCaseArray
                        ReplyCase("FAIL" "*")
                        {    // OpArray
                            SendNotify(" " "EXECUTING-
                                ROUTINE" "$RNAME"
"FAIL" "Request Compare to_Set_left_file NONE-
REQUIRED NONE-REQUIRED → R SB-COMPARE SET-
LEFT-FILE *")
                        }
                }
            }
    }
}
```

Figure 12:
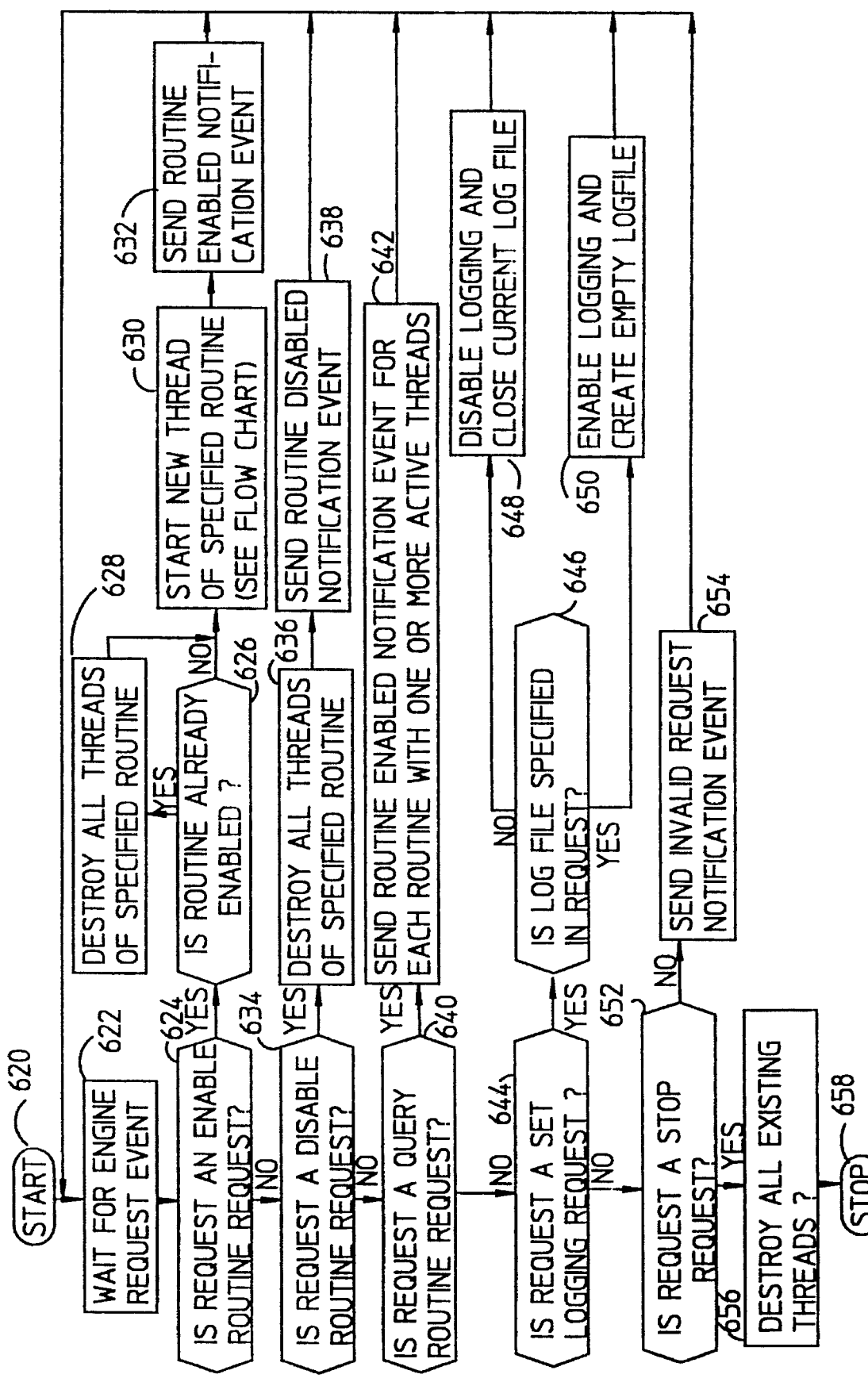
FIG. 12 shows a flow diagram illustrating the possible operations of the engine according to the present invention.

FIG. 12 is a flow diagram illustrating the possible functions of the engine according to the present invention. Initially, the engine control program 602 detects that an engine request event is present at block 622. The engine control program 602 determines whether the request is an enable routine request at 624. If the request is an enable routine request, the engine control program 602 determines whether the routine is already enabled at 626. If the routine is already enabled, the engine control program 602 has all threads of the specified routine destroyed at 628 and then starts a new thread of the specified routine at 630, otherwise, a new thread of the specified routine is simply started at 630. The engine control program 602 then sends an event at 632 notifying the routine manager that the routine has been enabled. The engine control program then returns to step 622 and waits idle for another request from the routine manager.

If at block 624 the request is not an enable request, the engine control program 602 determines whether the request is a disable routine request at 634. If so, the engine control program 602 destroys all threads of the specified routine at 636, sends a routine disabled notification to the routine manager at 638, returns to 622, and waits for another request from the routine manager.

If the request is neither an enable request nor a disable request, the engine control program 602 then determines whether the request is a query routines request, in which case the engine control program 602 sends a routine enabled notification event to the routine manager for each routine with one or more active threads at 642. The engine control program 602 then returns to 622 and waits for another request from the routine manager.

If the request is neither an enable request, a disable request, or a query routines request, the engine control program 602 then determines whether the request is a set logging request at 644, in which case the engine control program 602 determines whether the log file is specified. If it s not specified, the engine control program 602 then disables the logging and closes current log file at 648. If the log file is specified, the engine control program 602 enables logging and creates an empty log file at 650.

If none of the above mentioned requests are detected, the engine control program 602 determines whether the request is a stop request, in which case the engine control program has all existing threads destroyed and stops. If the request is not a stop request, the engine control program 602 then sends an invalid request notification event at 656 to the routine manager, returns to 622 and waits for another request from the routine manager.

Figure 13:
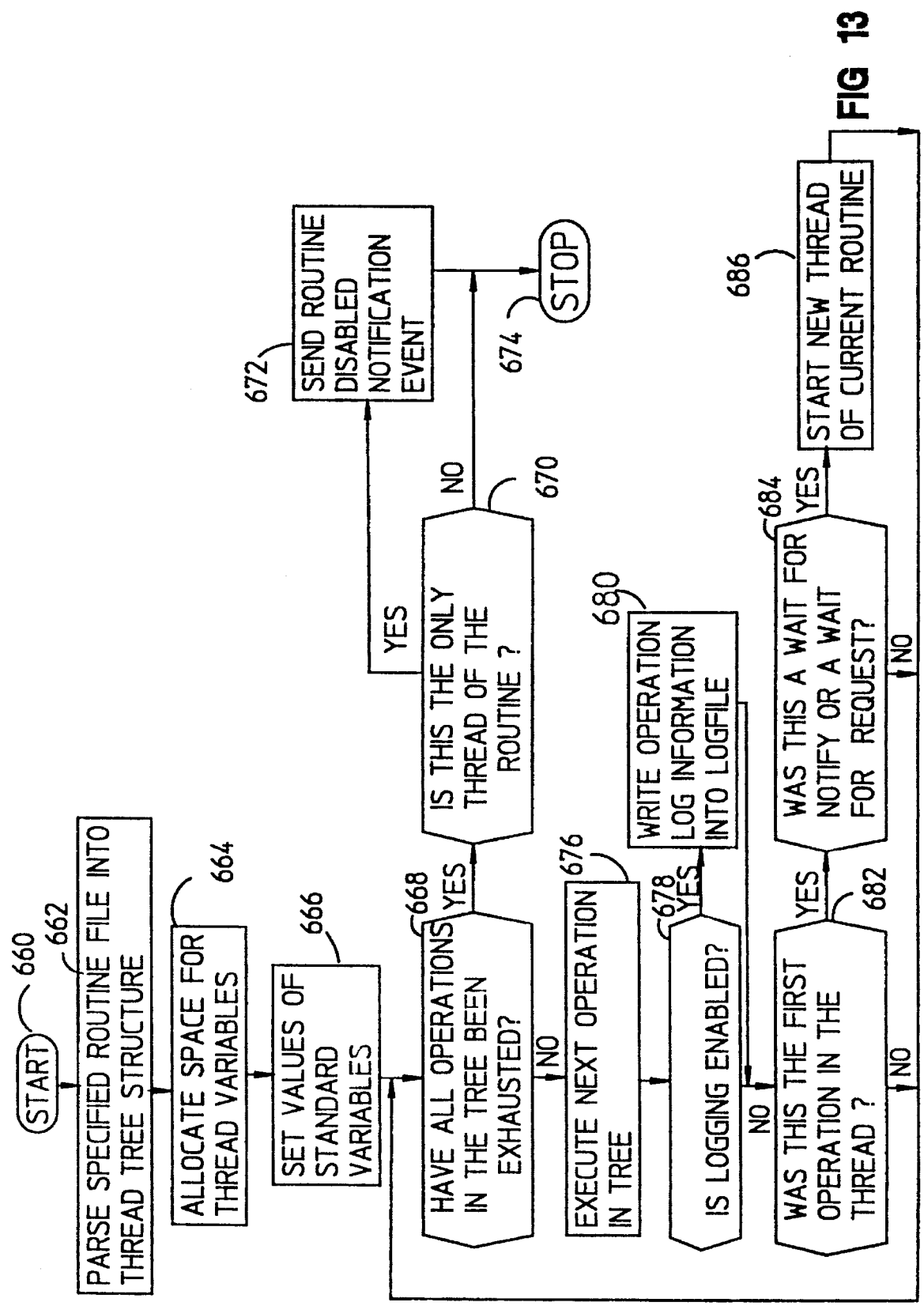
FIG. 13 shows a flow diagram illustrating a typical usage of the engine according to the present invention.

FIG. 13 is a flow diagram illustrating a typical usage of the engine. Referring now to FIGS. 12 and 14, if the request is an enable routine request (as noted above in FIG. 12 at block 624), after the engine control program creates a new thread of the specified program at 630, the thread parser 610 parses the specified routine file into a thread tree structure at 662. The thread parser 610 also allocates space for thread variables in the thread variable structures 608 at block 664. The thread parser 610 then sets the values of the standard variables at block 666. Next, the thread tree interpreter 604 checks to see if all operations in the tree have been exhausted.

If there are more operations in the tree to be executed, the thread tree interpreter 604 executes the next operation in the tree at 676. The interpreter 604 then determines whether logging is enabled at block 678. If logging is enabled, the interpreter 604 writes the operation log information into the log file 332. Next, the interpreter 604 determines whether the operation just executed was the first operation. If it is the first operation, the interpreter 604 determines whether the operation is a wait for notify or a wait for request, in either of which cases, the interpreter 604 starts a new thread of the current routine in the routine file 324 at block 686. Otherwise, the interpreter 604 returns to block 668 and repeats steps 668–686 until all operations in the tree are exhausted.

Once all of the operations in the tree are exhausted, the thread tree interpreter 604 determines whether the thread running is the only thread of the routine, in which case the thread is completed and destroyed. The engine then sends a routine disabled notification to the routine manager 310 and stops.

It will be readily apparent to one of ordinary skill in the art that the engine is capable of much more than merely enabling the message connector of the present invention. For example, the engine could be utilized to detect and generate user interface events in the user windows of software tools instead of detecting and generating message events as described in the preceding example. With this alternative implementation, similar tool interactions could be achieved even with tools which do not generate events notifying other tools in the environment that a function has been performed. As this alternative implementation implies, the engine is not limited to a system that utilizes a message server, but can operate on any computer system that utilizes some form of event dispatching mechanism.

The foregoing description of the invention has been presented for purposes of illustration and description. It is not intended to be exhaustive or to limit the invention to the precise form disclosed, and other modifications and variations may be possible in light of the above teachings. For example, the invention is not limited to a computer system employing a message server, but may be implemented into any computer system that employs requests and/or notifications of events, as will be readily apparent by one possessing ordinary skill in the art. Also, the message connector may be triggered by more than a single "when" event; it may be triggered by one or more than one "when" event(s), one or more than one "then" event(s) of another routine, one or more than one non-tool event(s), or any combination of these events.

The embodiment was chosen and described in order to best explain the principles of the present invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

---

APPENDIX

```
*/
Routine:
        RoutineList
    |   StandardRoutine
    |   ServiceRoutine
    ;
RoutineList:
        "RoutineList" RoutineNameArray
    ;
StandardRoutine:
        "StandardRoutine(" StringPattern=tool-
        class ')' OpArray
    ;
OpArray: '{' opList '}' | [ ];
opList:
        Op opList
    |   [ ]
    ;
Op:
        SendRequest
    |   SendNotify
    |   WaitForNotify
    |   WaitForNotify
    |   Enable
    |   Disable
    |   Concurrent
```

APPENDIX

```
    |   SendReply
    ;
SendRequest:
        "SendRequest(" StringPattern=comment Value-
        Pattern=toolclass ValuePattern=action ValuePattern=
        operand Value-Pattern=data ')'
        ReplyCaseArray
    ;
ReplyCaseArray:
        '{' replyCaseList '}' | [ ];
replyCaseList:
        [ ]
    |   ReplyCase replyCaseList
    ;
ReplyCase:
        "ReplyCase(" Pattern=status DataPattern=
        data ')' OpArray
    ;
SendNotify:
        "SendNotify(" StringPattern=comment Value-
        Pattern=action ValuePattern=operand ValuePattern=
        status ValuePattern=data ')'
    ;
WaitForNotify:
        "WaitForNotify(" StringPattern=comment
        Pattern=toolclass Pattern=host Pattern=dir Pattern=
        operand Pattern=action ')' DataCaseArray
    ;
WaitForNotify:
        "WaitForNotify(" StringPattern=comment
        Pattern=toolclass Pattern=host Pattern=dir Pattern=
        operand Pattern=action Pattern=status ')'
        DataCaseArray
    ;
DataCaseArray:
        '{' DataCaseArraytail '}'
    |   [ ]
    ;
DataCaseArraytail:
        [ ]
    |   DataCase DataCaseArraytail
    ;
DataCase:
        "DataCase(" DataPattern=data ')' OpArray
    ;
Enable:
        "Enable(" RoutineName ')'
    ;
Disable:
        "Disable(" RoutineName ')'
    ;
Concurrent:
        "Concurrent" ConcurrentArray
    ;
ConcurrentArray:
        '{' concurrentList '}' | [ ];
concurrentList:
        Op concurrentList
    |   [ ]
    ;
RoutineNameArray:
        '{' RoutineNameArraytail '}'
    ;
RoutineNameArraytail:
        [ ]
    |   RoutineName RoutineNameArraytail
    ;
/* Note: the exact form of a PATTERN is described elsewhere */
RoutineName: PATTERN
    ;
DataPattern: PATTERN
    ;
Pattern: PATTERN
    ;
ValuePattern: PATTERN
    ;
StringPattern: PATTERN
    ;
```

APPENDIX

```
ServiceRoutine:
        "ServiceRoutine(" StringPattern=toolclass StringPattern=
        action ')' ServiceCaseArray
    ;
ServiceCaseArray
    :   '{' serviceCaseList '}'
    |   [ ]
    ;
serviceCaseList: ServiceCase serviceCaseList
    ;
ServiceCase:
        "ServiceCase(" Pattern=operand DataPattern=
        data ')' OpArray
    ;
// Only legal within a ServiceRoutine. Should also ideally do
path
// analysis to ensure only one reply is possible:
SendReply: "SendReply(" ValuePattern=status ValuePattern=
        data ')'
    ;
```

What is claimed is:

1. A method of automating and controlling execution of software tools in a computer system comprising an electronic digital computer and a memory containing computer software comprising a plurality of software tools which include means for communicating with each other through an event dispatching mechanism, said automating and controlling execution of software tools being accomplished by a method comprising the steps of:

a routine editor building at least one tool interaction routine out of human language abstractions, wherein said tool interaction routine is a set of user defined rules, whereby upon the occurrence of a user specified event, at least one user specified operation of one of said plurality of software tools is initiated;

an engine translating raw messages associated with said human language abstractions of said at least one tool interaction routine into a routine file, said routine file comprising a sequence of machine executable operations;

a routine manager enabling at least one tool interaction routine;

a message connector monitoring for said user specified event to occur; and upon the occurrence of said user specified event, said message connector instructing said one of said plurality of software tools to initiate said at least one user specified operation.

2. The method of automating and controlling execution of software tools in a computer system as recited in claim 1, wherein the step of building at least one tool interaction routine includes the steps of:

selecting at least one user specified tool function as a when event; and selecting at least one user specified tool function as a then event.

3. The method of automating and controlling execution of software tools in a computer system as recited in claim 1, wherein the step of building at least one tool interaction routine includes the steps of:

selecting at least one user specified non-tool event as a when event; and selecting at least one user specified tool function as a then event.

4. The method of automating and controlling execution of software tools in a computer system as recited in claim 2, wherein the step of building at least one tool interaction routine includes the additional step of:

applying user defined pattern matching to said tool interaction routine.

5. The method of automating and controlling execution of software tools in a computer system as recited in claim 3, wherein the step of building at least one tool interaction routine includes the additional step of:

applying user defined pattern matching to said tool interaction routine.

6. The method of automating and controlling execution of software tools in a computer system as recited in claim 1, wherein the step of initiating said at least one user specified operation includes the steps of:

sending at least one request event for said at least one operation to be initiated; and a tool receiving said at least one request event for said at least one operation to be initiated.

7. The method of automating and controlling execution of software tools in a computer system as recited in claim 1, wherein the step of initiating said at least one user specified operation includes the steps of:

sending at least one notification event for said at least one operation to be initiated; and a tool receiving said at least one notification event for said at least one operation to be initiated.

8. An apparatus for automating and controlling execution of a plurality of software tools in a computer system, said apparatus comprising:

an electronic digital computer including a central processing unit and a memory unit containing computer software for operating said computer, said computer software comprising a plurality of software tools;

an event server for dispatching events between said plurality of software tools;

a routine editor for building and editing user specified routines out of human language abstractions, said user specified routines comprising sets of user defined rules, whereby upon the occurrence of at least one user specified event, at least one corresponding user specified operation is initiated;

a routine manager for managing any routines built by said routine editor;

an engine for translating raw messages associated with said human language abstractions into a routine file, said routine file comprising a sequence of machine executable operations; and a message connector for monitoring for the occurrence of a user specified event and communicating request messages for any user specified actions corresponding to said user specified event to said event server.

9. The apparatus for automating and controlling execution of a plurality of software tools in a computer system as recited in claim 8 further comprising:

an execution manager for enabling a particular software tool that is not running when a function of mid particular software tool has been requested.

10. A method of automating and controlling execution of software tools in a computer system comprising an electronic digital computer and a memory containing computer software for operating said computer, said computer software comprising a plurality of software tools which include means for communicating with each other through an event dispatching mechanism, said automating and controlling execution of software tools being accomplished by a method comprising the steps of:

a routine editor building at least one tool interaction routine out of human language abstractions presented by a routine editor, wherein said tool interaction routine is a set of user defined rules, whereby upon the occurrence of a user specified event, at least one user specified operation is initiated;

an engine translating raw messages associated with said human language abstractions of said at least one tool interaction routine into a routine file, said routine file comprising a sequence of machine executable operations;

after a user enable said at least one tool interaction routine using a routine manager, a message connector listening for the user specified event of said at least one tool interaction routine; and upon the occurrence of said user specified event, said engine initiating said at least one user specified operation associated with said user specified event.

11. The method of automating and controlling execution of software tools in a computer system as recited in claim 10, wherein the step of initiating said at least one user specified operation associated with said user specified event includes the steps of:

a message connector requesting an event server to instruct an appropriate tool to initiate said at least one user specified operation;

said event server instructing said appropriate tool to initiate said at least one user specified operation; and said appropriate tool initiating said at least one user specified operation.

12. The method of automating and controlling execution of software tools in a computer system as recited in claim 11, wherein the step of initiating said at least one user specified operation associated with said user specified event includes the additional step of:

an execution manager starting said appropriate tool, if said appropriate tool is not running when said event server instructs said appropriate tool to initiate said at least one user specified operation.

* * * * *